United States Patent [19]

Tabata et al.

[11] Patent Number: 4,510,536
[45] Date of Patent: Apr. 9, 1985

[54] SIGNAL CONDITIONING METHOD AND APPARATUS FOR FM CODE SIGNAL

[75] Inventors: George K. Tabata, Wilmington; Raymond Yardy, Irvine, both of Calif.

[73] Assignee: Discovision Associates, Costa Mesa, Calif.

[21] Appl. No.: 399,049

[22] Filed: Jul. 16, 1982

[51] Int. Cl.³ .................. G11B 5/45; G11B 15/02
[52] U.S. Cl. ............................ 360/65; 360/25
[58] Field of Search .............. 360/46, 65, 68, 43, 360/25

[56] References Cited

U.S. PATENT DOCUMENTS

| | | | |
|---|---|---|---|
| 3,007,010 | 10/1961 | Erath et al. | 360/65 |
| 3,405,403 | 10/1968 | Jacoby et al. | 360/67 |
| 3,927,420 | 12/1975 | Hayashi et al. | 360/65 |
| 4,148,078 | 4/1979 | Riddle, Jr. | 360/27 |
| 4,156,256 | 5/1979 | Obremski | 360/22 |
| 4,200,889 | 4/1980 | Strobele | 360/65 |
| 4,314,289 | 2/1982 | Hayes | 360/46 |

FOREIGN PATENT DOCUMENTS 2300524  8/1973  Fed. Rep. of Germany ........ 360/65

Primary Examiner—Vincent P. Canney
Attorney, Agent, or Firm—Ronald J. Clark

[57] ABSTRACT

A signal conditioning method and apparatus for preconditioning an FM code signal prior to its processing by a limited bandwidth medium such as an audio magnetic recording track. The FM code signal is preconditioned to limit its bandwidth and alter its phase equalization prior to processing by the medium. The phase equalization is altered in a way opposite to the alteration performed subsequently by the limited bandwidth medium, such that the conditioned signal after recovery from the medium has substantially no phase distortion relative to the input signal and no high energy distortion. The invention is particularly useful when an FM code signal is to be mixed with an analog signal and the composite signal is first processed by a limited bandwidth medium and is then processed by a further analog medium, such as an FM modulator.

3 Claims, 6 Drawing Figures

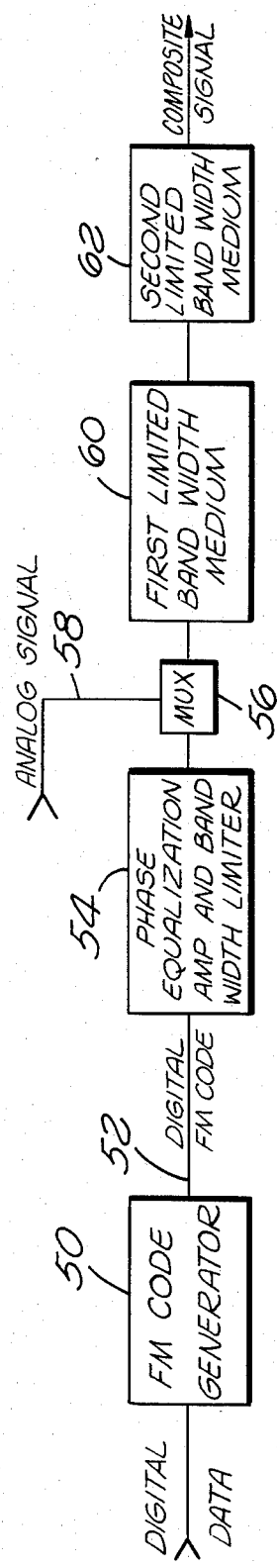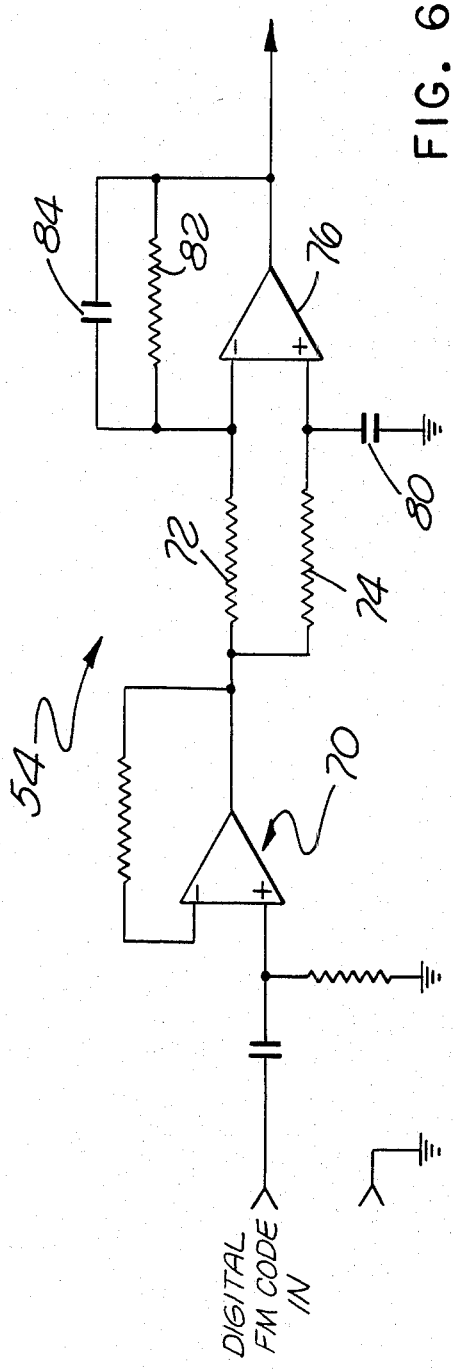

SIGNAL CONDITIONING METHOD AND APPARATUS FOR FM CODE SIGNAL

This invention relates generally to signal conditioning methods and circuits, and more particularly, to signal conditioning methods and circuits to avoid distortion of digital FM code signals when those signals are recorded and played back on audio recording tracks or similar limited bandwidth recording media.

FM code signals are self clocking digital representations of digital data commonly used for serially storing or representing digital data which must be asynchronously interpreted. One use for these signals is the storing of digital information on the audio tracks of a videodisc. The FM code signal is a series of approximately rectangular waveforms having spaced transitions between high level and low level signals. The spacing between the transitions carries both the timing information and the encoded data. The "high" and "low" states of the code can be represented by contrasting colors to be read by a scanning light beam, or by high or low level electric or magnetic signals.

For certain applications, including the mastering of videodiscs, it is advantageous to store the FM code signals on a conventional recording medium such as a magnetic audio recording track. However, since the bandwidth of such media are severely limited, such media are not capable of reproducing the waveform accurately. Due to the limited bandwidth, the very high frequency components of the signal are attenuated and the phase of the higher frequency components are shifted relative to the phase of the lower frequency components. Additionally, a "differentiation" of the signal occurs, producing tall overshoot spikes at the transitions. The combined result of these distortions is a waveform in which the transitions are delayed and tilted away from the vertical and the amplitude of the signal between transition varies over a very wide range. Accordingly, when the RMS value of such a signal is adjusted to match the RMS value of the input signal, the output signal may include spikes several times greater in intensity than the peak value of the input signal, and the spacing between the transitions anywhere except the exact 0 point of the AC signal will be very different from the spacing of the original rectangular waveform.

Since the spacing between the transitions carries both the clocking and data information, this distortion makes the FM code signal much more difficult to interpret.

Furthermore, if it is then necessary to further process this signal using any means which are amplitude dependent, such as encoding the signal into FM form using a voltage controlled oscillator or the like (as is done when transferring a signal to a videodisc), the high energy spikes and greatly varying signal levels between transitions will result in considerable undesirable noise in the processed signal. For example, the high amplitude spikes which contain high frequency energy will be even further emphasized by the high frequency preemphasis designed into most FM modulators and will cause the frequency modulation of the voltage controlled oscillator to be briefly far outside the bandwidth necessary to carry the information. This will result in the overlaping of closely spaced frequency multiplexed signals and a complete loss of signal if the encoded FM signal is sent through a bandpass filter to separate it from noise or other signals. Such losses of signal can result in the generation of erroneous transitions introducing errors in both the timing information and the encoded data.

Simple filtering or limiting procedures to correct for the distortion of the FM code signal after its recording and reproduction have proven ineffective since they tend to further alter the spacing between the transitions or to introduce further variation in the signal level between actual FM code signal transitions.

While the signal could be corrected using digital techniques, most of the applications for FM code are in low cost systems or analog storage and transmission systems which carry audio or other information in addition to the FM code information, and digital processing of the signals is undesirable due to its expense and the need to switch the digital processing on when the signal is an FM code signal and off when the signal is some other type of signal.

SUMMARY OF THE INVENTION

The present invention provides a conditioning method and apparatus for preconditioning an FM code signal prior to its recording on limited bandwidth recording media. The signal conditioning system of the present invention alters the phase equalization of the signal and limits the bandwidth so that the signal recovered from the limited bandwidth storage medium and including the distortion introduced by the limited bandwidth storage medium does not contain substantial high energy distortion or phase distortion.

Since the signal conditioner of the present invention is applied to the digital FM code prior to its recording, it can be placed in the system at a point prior to the mixing of the FM code signal with any other type of signal. In this way, it is not necessary to switch the system of the present invention on and off based on the type of signal carried by the system at that time. Additionally, since the signal conditioning performed by the present invention is not digital in nature, it is relatively inexpensive when compared to prior art techniques.

It is therefore an object of the present invention to provide a method and apparatus for preprocessing an FM code signal prior to its recording on a limited bandwidth recording medium or its transmission through a limited bandwidth transmission system, such that after the pre-conditioned signal is distorted by the recording or transmission system, the resultant signal is substantially undistorted relative to the input signal.

It is a further object of the present invention to provide a preconditioning method and apparatus which limits the bandwidth of an input FM code signal and alters the phase equalization of the FM code signal to prevent high energy distortion by the limited bandwidth recording or transmission system and to cancel out the change in phase equalization introduced by the limited bandwidth recording or transmission system.

Finally, it is an object of the present invention to provide a method and apparatus for preconditioning an FM code signal by rolling off the high frequency components of the signal and by altering the phase of high frequency components of the signal.

In its broadest sense, the present invention encompasses a signal processing system in which a digital FM code signal is "predistorted" in a manner opposite to the distortion added by a subsequent process step, and this "predistorted" signal is then added to an analog signal by time multiplexing or the like and this composite signal is transmitted or recorded by limited bandwidth media without need to further separately process the FM code signal until the FM code signal is be separated for use.

In the preferred implementation of the present invention, the FM code signal is fed through a signal processing circuit which limits the bandwidth of the signal by rolling off the high frequency components of the signal which would otherwise lead to high energy distortion when "differentiated" by subsequent limited bandwidth recording or transmitting media. Additionally, the circuit alters the phase equalization of the FM code signal in a manner opposite to the phase equalization altering effects of the subsequent stages.

This circuit can preferably take the form of a phase equalization amplifier and a low pass filter. The low pass filter can conveniently take the form of a high pass filter in the negative feedback loop of the phase equalization amplifier.

BRIEF DESCRIPTIONS OF THE DRAWINGS

Many other aspects of the present invention and the advantages thereof will become apparent from the following description of the preferred embodiment, taken in conjunction with the accompanying drawings in which:

FIG. 5 is a schematic block diagram of a system employing the present invention; and FIG. 6 is a circuit schematic diagram of a phase equalization anplifier and low pass filter in accordance with the present invention.

DETAILED DESCRIPTION OF THE PREFERRED EMBODIMENT

Figure 1:
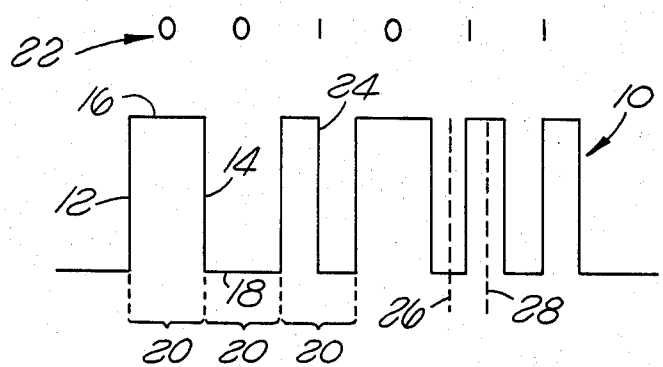
FIG. 1 is the waveform of a typical FM code signal.

As shown in FIG. 1, the waveform 10 of an FM code signal is a train of approximately rectangular pulses defined by positive going transitions 12, negative going transitions 14, high level areas 16 and low level areas 18. The transitions 12 and 14 occur at least at the beginning and end of each data cell time 20. The transitions occuring at the beginning and ends of the data cells 20 define the timing information for the signal and are used to clock the signal through digital processing stages.

The FM code signal pictured in FIG. 1 represents a digital binary word 22. As shown in the figure, a data cell 20 having signal transitions 12 and 14 only at the beginning and end thereof is commonly defined to represent a binary 0. On the other hand, a data cell 20 containing a transitioh 24 intermediate the beginning and end thereof is defined to represent a binary 1. Naturally, the definition of the binary digits may be reversed in various applications.

Systems for generating and decoding FM code signals are well known in the art and will not be discussed in detail here except to explain that FM code signals are often interpreted by circuitry which samples the signal level at the 25 percent point 26 of a data cell and compares that to the value of the signal at the 75 percent point 28 of the same data cell. If the signal levels are the same, the data cell is considered to contain a 0. If the signal levels are opposite, the data cell is considered to contain a binary 1.

It can be appreciated that the signal transitions are used not only to clock the information though digital processing systems, but also to define the 25 percent point 26 and the 75 percent point 28 used in interpreting the FM code signals. Accordingly, the transitions must be unambiguous and definite. This implies that the transitions must be of greater variation than any noise or other variation of the levels 16 and 18 between transitions, and that the transitions must be relatively short in duration or "steep".

Naturally, in order to achieve a perfectly rectangular waveform, it is necessary to have an infinite bandwidth, since a squarewave is an infinite sum of odd harmonics of a sine wave. Put another way, the slew rate of the system must be infinite in order to pass instantaneous or "vertical" transitions.

Figure 2:
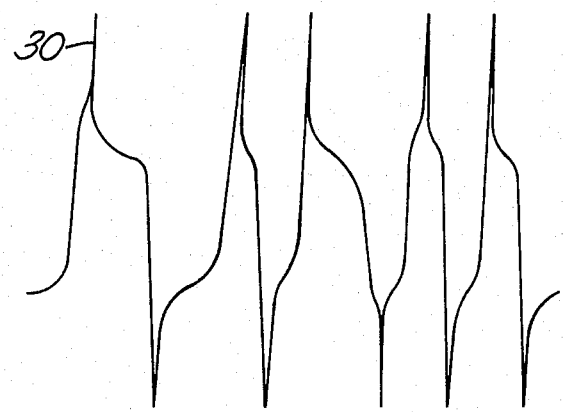
FIG. 2 is the output waveform of an FM signal fed through a limited bandwidth media without preprocessing.

Typical digital circuitry achieves a close approximation of a rectangular waveform and the FM code signal generated by digital systems is roughly rectangular. However, the analog systems on which these FM code signals are typically recorded or transmitted are designed to handle a relatively narrow bandwidth and are incapable of reproducing a rectangular waveform. In addition to relatively poor high frequency response which tends to slant the transitions away from the vertical, inherent impedances in the systems tend to "differentiate" the waveform to produce high energy spikes 30 as shown in FIG. 2. While the waveform of FIG. 2 can be processed by appropriate digital circuitry to reproduce the waveform of FIG. 1, this reprocessing would be economically unfeasible if the FM code signal was to be processed by further limited bandwidth media which would necessitate further digital processing of the signal and which would necessitate the separation of the digital signal from any other signals carried by the same analog medium and the subsequent recombining of the processed digital signal with the analog signal for feeding to the subsequent analog media.

If the distorted waveform shown in FIG. 2 is directly fed to an analog media, the high energy spike 30 can cause further distortion due to their relatively high amplitude. If, for example, the waveform of FIG. 2 was used to control the frequency of a voltage controlled oscillator to thereby encode the signal as an FM signal, the spikes 30 would cause frequency shifts far outside the normal bandwidth required to carry the information. If the amplitude of the signal of FIG. 2 is reduced to limit the resultant bandwidth, the change in frequency representing the actual transition is simultaneously reduced, thereby making the signal far more susceptible to errors due to random noise.

If the waveform of FIG. 2 is directly encoded as a frequency modulated signal, and that frequency modulated signal is subsequently fed through a bandpass filter in accordance with conventional noise limiting techniques, the frequency extremes corresponding to the spikes 30 will fall outside of the passband of the filter causing an FM detector downstream of the bandpass filter to lose its carrier signal input and react to any noise present.

In order to avoid the high energy distortion and phase distortion shown in FIG. 2 without the need for processing the signals between two analog signal processing stages, the present invention provides for the "preprocessing" of the FM code signal prior to its mixing with other signals and introduction to the first of the limited bandwidth analog signal processing stages.

Figure 3:
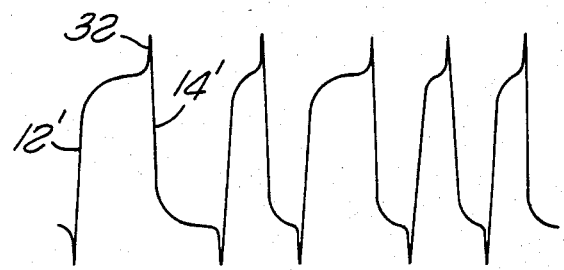
FIG. 3 is the waveform of an FM code signal as processed in accordance with the present invention.

FIG. 3 shows the waveform of FIG. 1 as processed in accordance with the present invention.

The transitions 12' and 14' of the waveform of FIG. 3 are longer in duration (slanted away from the vertical) than those of FIG. 1 due to the rolling off of the high frequency components. Additionally, the waveform of FIG. 3 includes pretransition spikes 32 formed by the phase equalization altering performed in accordance with the present invention. The amplitude of the spike 32 is relatively low in comparison with the spike 30 of FIG. 2 and therefore does not result in any overdriving problems in subsequent stages.

Figure 4:
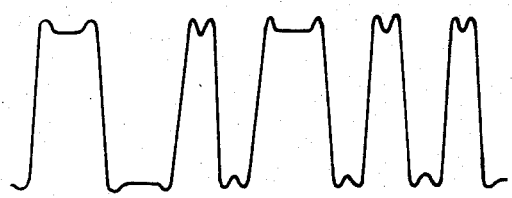
FIG. 4 is the waveform of an FM code signal after preprocessing in accordance with the present invention and subsequent processing by a limited bandwidth medium.

When a waveform of FIG. 3 is processed by a limited bandwidth medium such as the audio track of an analog magnetic tape recorder, a waveform similar to that shown in FIG. 4 will be produced. This waveform does not contain any high energy spikes and the transitions are free of any distortion which could result in improper decoding of the signals.

FIG. 5 is a block diagram of a typical system employing the present invention. Digital data enters the FM code generator 50 where it is encoded into an FM code signal which is output on line 52. This encoded signal is then fed to the phase equalization amplifier and bandwidth limiter 54 which preprocesses the signal as described above. This preprocessed signal is one input to a multiplexer 56 which may take the form of a simple switch or which may be a time sharing multiplexer controlled by the presence of the preprocessed FM code signal or by other external means (not shown). The multiplexer 56 has one or more additional inputs 58 for receiving analog signals such as audio information.

The composite signals from the multiplexer 56 are fed to the first limited bandwidth medium 60. This medium may be a magnetic audio recording track or the like or a signal transmission system such as a conventional telephone line which distorts the preprocessed FM code signal from the phase equalization amplifier and bandwidth limiter 54 to result in an output signal which has substantially no high level distortion or phase equalization distortion relative to the input digital FM code signal appearing on line 52. This signal is suitable for direct feeding to a second limited bandwidth medium 62 such as a voltage controlled oscillator for encoding both the digital FM code signal and the analog signal as a composite FM signal. Because of the preprocessing of the FM code signal prior to its multiplexing with the analog signal and processing by the first limited bandwidth medium 60, the signal output by the first limited bandwidth medium 60 can be processed by the second limited bandwidth medium 62 (such as an FM modulator) without significant additional distortion.

FIG. 6 is a schematic diagram for a preferred embodiment of the phase equalization amplifier and bandwidth limiter 54. The circuit includes a buffer amplifier 70 which is conventional and need not be described in further detail. The output of the buffer amplifier 70 is a low impedance source driving two paralled resistors 72 and 74 through which the signal from the buffer amplifier is split. The first resistor 72 directly feeds the inverting input of a differential amplifier 76. Resistor 74 feeds the non-inverting input of the differential amplifier 76 which is also coupled to ground through the capacitor 80.

Since the impedance of capacitor 80 varies with frequency, capacitor 80 and resistor 74 form a low pass filter feeding the non-inverting input of differential amplifier 76. Accordingly, while low frequency signals are fed through resistors 72 and 74 to both the inverting and non-inverting inputs of differential amplifier 76, high frequency signals are filtered by the low pass filter and are fed only to the inverting input. This causes the phase of the high frequency components to be inverted, thus altering the phase equalization of the signal in a manner opposite to the effect of limited bandwidth analog media, such as magnetic audio recording tracks.

Resistor 82 and capacitor 84 form the negative feedback loop for the differential amplifier 76. Capacitor 84 acts as a high pass filter for the negative feedback and causes the overall amplifier circuit to have low pass characteristics.

In a representative circuit capable of producing the output waveform shown in FIG. 3, a 741 linear differential input operational amplifier was employed for differential amplifier 76. The value of resistors 72, 74, and 82 was taken to be 1K, the value of capacitor 80 was 0.013 microfarads, and the value of capacitor 84 was 0.0047 microfarads. The buffer amplifier 70 was also constructed using a 741 linear differential input operational amplifier.

Naturally, any circuits capable of producing the necessary roll-off of the high frequencies and an appropriate altering of the phase equalization could be used in implementing the present invention.

Additionally, the preprocessing of a digital FM code signal prior to mixing that processed signal with analog signals can be used in a great many systems.

Accordingly, while the present invention has been described in detail in connection with a specific embodiment and implementation, various alternatives are contemplated within the scope of the invention, and the scope of the invention is to be limited only by appended claims.

What is claimed is:

1. A method of encoding a digital FM code signal and an analog signal as an FM signal of limited bandwidth without distortion caused by phase distortion introduced in an intermediate recording step and without separate processing of the digital signal between the recording and the encoding, comprising the steps of:
    generating the desired FM code signal;
    limiting the bandwidth of the FM code signal;
    altering the phase equalization of the FM code signal;
    recording the bandwidth-limited and phase-equalization-altered FM code signal as an AM signal on a recording track;
    recording non-overlapping analog information on said recording track;
    recovering the recorded FM code signal and the recorded analog signal, said step of altering the phase equalization being performed such that the phase distortion of said phase-equalization-altered signal occurring during said recording and recovering steps results in a signal having substantially no phase distortion relative to the generated FM code signal; and
    frequency modulating a carrier signal over a predetermined limited bandwidth to thereby encode the recovered FM code signal and the recovered analog signal as an FM signal.

2. A method as claimed in claim 1, wherein said step of limiting the bandwidth of the FM code signal includes rolling off the high frequency components of the generated FM code signal to prevent the modulating of the carrier signals outside of the predetermined limited bandwidth as a result of high energy distortion of high frequency components of the FM code signal occurring during said recording and recovery steps.

3. A method as claimed in claim 1 or 2, wherein said steps of limiting the bandwidth and altering the phase equalization include the step of passing the generated signal through a phase equalization circuit having low pass filter characteristics.

* * * * *